United States Patent [19]

Purcell et al.

[11] Patent Number: 5,289,474
[45] Date of Patent: Feb. 22, 1994

[54] COMMUNICATION NETWORK INTERFACE TESTING SYSTEM

[75] Inventors: Joseph D. Purcell, Ann Arbor; Bruce Graham, Ypsilanti, both of Mich.

[73] Assignee: Allen-Bradley Company, Inc., Milwaukee, Wis.

[21] Appl. No.: 150,935

[22] Filed: Feb. 1, 1988

[51] Int. Cl.$^5$ .............................................. H04L 1/24
[52] U.S. Cl. ..................................... 371/20.5; 370/15
[58] Field of Search ............... 370/13, 15, 60; 371/22, 371/27, 20.5

[56] References Cited

U.S. PATENT DOCUMENTS 4,383,312  5/1983  Reed ..................................... 370/13
4,652,874  3/1987  Loyer ............................. 340/825.05

OTHER PUBLICATIONS

"IEEE Standards for Local Area Networks 802.2", pp. 15, 18-21, 23, 38-40, 43-50, 57 and 58.
E. Newcombe et al., "Error Rate Monitoring For Digital Communications", *Proceedings of the IEEE*, vol. 70, No. 8, Aug. 1982, pp. 805-828.
D. Murray, "Resourceful Debugger Sifts Through Faults in IEEE-802.3 LANs", *Electronic Design*, Jan. 24, 1985, pp. 173-180.
M. Sherif et al., "X.25 Conformance Testing-a Tutorial", *IEEE Communications Magazine*, vol. 24, No. 1, Jan. 1986, pp. 16-27.
Bux, W. et al., "Architecture and Design of a Reliable Token-Ring Network", IEEE Journal on Selected Areas in Communications, vol. SAC-1, No. 5, Nov. 1983, pp. 756-765.
Leibson, S., "IEEE 802.3 LAN Testers and Analyzers Pinpoint Network and Equipment Flaws", Electronic Design News, Apr. 30, 1987, pp. 59-66.
Spangenberg, S. et al., "Views on a Network Analyzer", BYTE, Jul. 1987, pp. 191-198.
Electronic Design, "Special Series on System Integration-Network Performance", Bailey, C., May 12, 1983, pp. 204-210.
IEEE Micro, "The MC68824 Token Bus Controller", Dirvin, A., et al., Jun. 1986, pp. 15-25.
Excelan LANalyser EX5000E Advertisement, Data Communications, Jul. 1986, p. 121.
Digilog 300,600,800 Protocol and Performance Analysers Advertisements, Data Communications, Dec. 1986, pp. 202-203.
ANSA/IEEE Std. 8024-1985, Token-Passing Bus Access Method and Physical Layer Specifications, pp. 42-43, 49, 130-133, 169, 207.
Intel 82586 Local Communications Controller-Advance Information, Oct. 1982.
Jacobson, D., et al., "A Master/Slave Monitor . . . for an Operating Ethernet Network", IEEE Network, Jul. 1987, vol. 1, No. 3, pp. 40-48.
Couch, D., "Measuring the Performance of a Mixed--Vendor Ethernet", Data Communications, Aug. 1987, pp. 139-145.
Held, G., Data Communications Testing and Troubleshooting, Howard W. Sams & Co. Pub., 1988, pp. 98-102, 105-106, 111-118, 133-137.
Zett, J., "Evaluating and Testing LAN Performance", Telecommunication Products and Technology, Aug. 1987, pp. 40-44.
Tanenbaum, A., "Computer Networks", copyright 1988 by Prentice Hall, Inc, pp. 325-331.

*Primary Examiner*—Stephen M. Baker
*Attorney, Agent, or Firm*—Quarles & Brady

[57] ABSTRACT

Data is sent over a digital communication network in a message frame which includes a header, a data field and an end delimiter. An analyzer for such a network evaluates the response of network interface devices to test message frames. Included in the analyzer is a mechanism for creating a test message frame which allows the user to define a number of pad-idle symbols, a sequence of symbols for a start delimiter, a series of symbols for the data field and a set of symbols for the end delimiter. The use defined test message frame may include invalid symbols to test the error response of the interface device. A transmitter is provided for repeatedly sending the test message frame to the network interface device with a given number of silence symbols inserted between each repetition. The analyzer has a section for receiving message frames back from the network interface device and sequentially comparing the symbols of the test message frame to those of the received message frame. A count is maintained of the number of received message frames which do not coincide with the test message frame.

8 Claims, 3 Drawing Sheets

COMMUNICATION NETWORK INTERFACE TESTING SYSTEM

BACKGROUND OF THE INVENTION

The present invention relates to data communication networks and particularly to equipment for testing the interface to the network.

Communication networks are used to interconnect a variety of data processing equipment. The network allows a given piece of equipment to communicate with different pieces of equipment at various times. In order for data processing equipment from a variety manufacturers to be able to communicate over the same network, the equipment must strictly adhere to a well defined protocol for the particular network.

The International Standards Organization (ISO) has developed an open system interconnect (OSI) model for a data communication network which consists of seven layers defining a hierarchy of network protocol functions. The first two layers of the model, designated the physical and link layers, define the physical characteristics of the network and how the access to the network medium is controlled. An important part of the model is the definition of the interface between the data processing equipment and the data network devices, such as modems. The definition is in terms of the logical, electrical and mechanical characteristics of this interface.

One type of network to which this model applies is a broad-band token passing bus system. The term broad-band refers to the signals being sent and received on two separate frequency bands through a broad bandwidth medium. Each station on the network is coupled to the medium by a modem which transmits its data by modulating a signal at a first frequency. Head end equipment which controls the network, receives the transmitted signal, demodulates it and remodulates the recovered data on a signal at a second frequency. All of the network stations receive data by their modem demodulating this second frequency signal. Access to this network is controlled by passing the token from one station to the next. A given station can send messages on the network only when it holds the token and must periodically relinquish the token to the next station.

The data is sent over the network as a message frame consisting of a group of data symbols. Each message frame includes a header which is a series of data symbols that identify the start of the frame, a data field, and an end delimiter which signals the end of the frame. Although the contents of the data field vary from frame to frame, it must contain valid symbols, typically only those used to define one and zero data bits. This field cannot contain other symbols, such as pad-idle, and silence symbols, that are sent in the header and between message frames. Furthermore, the header and end delimiter must consist of a predefined symbol pattern in order for the frame to be properly transmitted over the network.

In order for a manufacturer to market interface equipment, such as modems, for a particular type of network, the equipment must be rigorously tested under a wide range of conditions and all conceivable operating modes to insure that it conforms to the protocol standards. The conventional technique for testing a network interface device previously involved attaching it to data terminal equipment which produced signals adhering to the protocol standard for the particular network. Message frames were then sent and received repeatedly via the interface device. The transmitted and received frames were compared to detect errors introduced by the device Since the transmission of message frames had to comply with the standard, the test transmission could not be continuous as the standard prevented any one station from holding the token for more than the prescribed time. By requiring the station testing the interface device to periodically relinquish the token even if it was the only station on the test network, the evaluation procedure became a prolonged process When conventional data terminal equipment was used to test an interface device, other dictates of the communication protocol also had to be adhered to. For example, the terminal equipment could only produce valid message frames having headers, end delimiters and a total length which conformed to the standard protocol. Strict adherence to the defined standard often prevented testing the interface device under worst case conditions and examining how the device responded to different errors.

SUMMARY OF THE INVENTION

The present apparatus for testing an interface device of a communication network permits the user to define the entire message frame. This enables invalid frames to be sent to the device to determine its ability to handle such frames. The frame can be repeatedly transmitted to the interface device with various amounts of time between frames. In addition, data can be continuously transmitted and the system does not have to conform to the token passing and frame length requirements of the network protocol The general object of the present invention is to offer a system for testing an interface device for a data communication network. A specific object is to provide such a system which does not have to formulate test message frames which comply with the standards for the network. This enables the interface to be tested under a wide variety of valid and invalid conditions. Another object of the present invention is to enable the test message frames to be sent to the interface device at different time intervals rather than those prescribed by the standard for the network on which the device is intended to be used. This enables faster testing and testing under a variety of worst case conditions.

Yet another object is to provide a testing system which performs a comparison of the transmitted and received message frames using hardware as opposed to a combination of hardware and software

DETAILED DESCRIPTION OF THE PRESENT INVENTION

Figure 1:
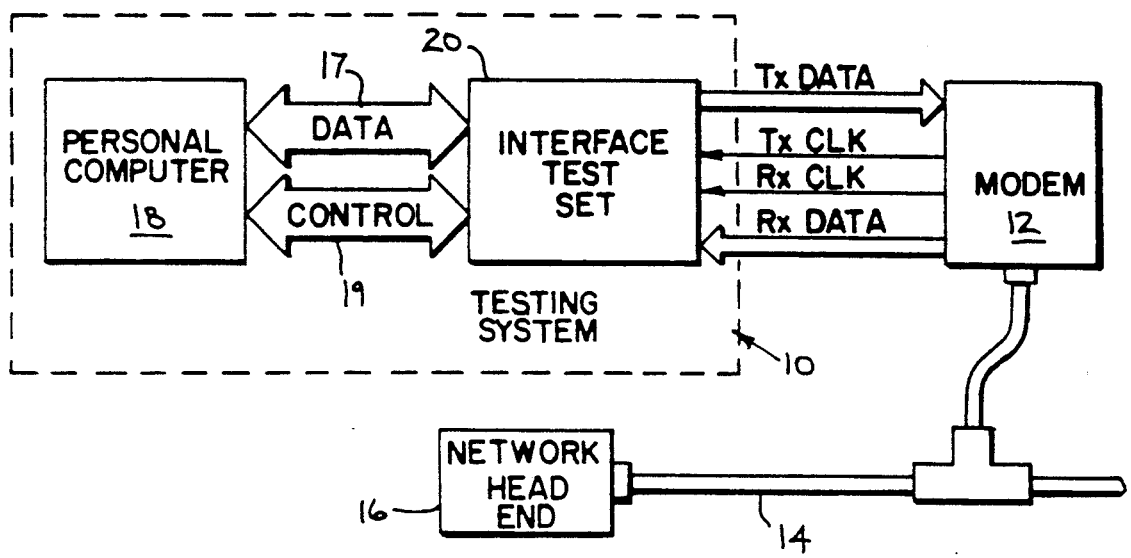
FIG. 1 is a block diagram of a testing system coupled by an interface device to a communication network.

As shown in FIG. 1, a communication network interface testing system 10 is connected to a modem 12 which serves as the interface to a network medium 14. A network head end 16 is attached to the medium 14 to supervise communication over the broadband network and to translate the data sent at the transmit frequency to a signal at the receive frequency of the network.

Figure 2:
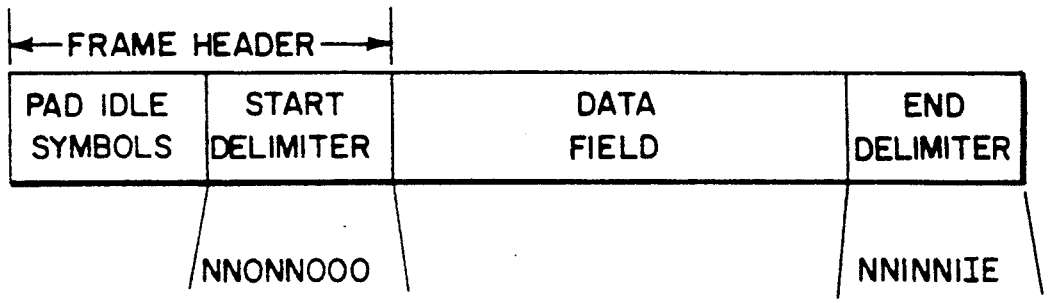
FIG. 2 depicts a conventional message frame for data which is transmitted over the communication network.

The testing system 10 includes a personal computer 18 and an interface test set 20 interconnected by a set of data and control bus lines 17 and 19, respectively. The data and control buses connect to a standard parallel interface circuit of the personal computer As will be described hereinafter, the personal computer 18 contains a software program than enables the user to create a test message frame which is sent over the network medium 14 by the test set. When the message frame is echoed at the receive frequency the test set detects errors in the signal processing by the modem 12 and head end 16. The interface test set 20 is able to repeatedly transmit the test message frame and compare the transmitted and received frames to detect errors. These errors are then sent to the personal computer 18 for analysis A conventional physical layer message frame is depicted in FIG. 2. At the beginning of the frame are 24 pad-idle symbols which provide a signal sequence that enables the receiver circuits in the network modems to synchronize to the data rate and data bit pattern of the message frame. Next is an eight symbol start delimiter consisting of the sequence of non-data (N) and zero (0) symbols, NN0NN000 Following the start delimiter is a variable length data field containing the message being sent over the network. This field includes the addresses of the transmitting and receiving stations as well as the actual message data. The data field normally includes only one and zero symbols. However, the protocol dictates that if sixteen or more consecutive ones or zeros occur in the field, a "kicker" pattern consisting of two non-data symbols and a zero symbol is inserted This pattern enables the receiver circuitry in the network modems to remain synchronized to the data signal. The message frame is terminated by an eight symbol end delimiter consisting of the symbol sequence NN1NN11E This sequence has a series of non-data (N) and one (1) symbols followed by two bits designated, I and E, which are each either a zero or a one symbol The I bit is used to indicate that the frame contains only part of a larger message and that other frames will follow. The E bit is used to indicate that the head end 16 in a broadband network detected a cyclical redundancy check (CRC) error for the data field.

The connection of the testing system 10 to the modem 12 complies with the Institute of Electrical and Electronic Engineers (IEEE) interface standard 802.4G. Specifically, four parallel data lines, collectively labeled Tx Data, carry four bits of data from the system to the modem which represent the data symbol for transmission. As per the standard, these four lines are designated TXSYM0, TXSYM1, TXSYM2 and TXSYM3. Each symbol to be sent over the network is encoded by a pattern of one and zero bits on these four lines according to Table 1.

TABLE 1

| Symbol | TXSYM3 | TXSYM2 | TXSYM1 | TXSYM0 |
|---|---|---|---|---|
| Silence | 1 | 1 | 1 | X |
| Non-data | 1 | 1 | 0 | X |
| Pad-idle | 1 | 0 | 1 | X |
| One | 1 | 0 | 0 | 1 |
| Zero | 1 | 0 | 0 | 0 |

An X entry in the table indicates that the value of the corresponding bit can be either a one or a zero logic level. The silence symbol is transmitted over the network by the head end 16 between message frames so that the receiving stations remain synchronized to the clock rate of the receive data signal. As described above, the non-data symbol is sent in the start and end delimiters of the frame and the pad-idle symbol is sent in the frame header to provide a transmission synchronization sequence. The one and zero symbols represent the binary data sent in the message frame.

A similar set of four data lines, collectively referred to as Rx Data, carry signals into the test set 20 representing the data received over the network medium 14 by the modem 12. As per the 802.4G standard, these lines are designated RXSYM0, RXSYM1, RXSYM2 and RXSYM3. Each data symbol that is received by the modem is sent on these lines as a parallel pattern of ones and zeroes according to Table 2.

TABLE 2

| Symbol | RXSYM3 | RXSYM2 | RXSYM1 | RXSYM0 |
|---|---|---|---|---|
| Silence | 1 | 1 | 1 | X |
| Non-data | 1 | 1 | 0 | X |
| Bad-signal | 1 | 0 | 1 | X |
| One | 1 | 0 | 0 | 1 |
| Zero | 1 | 0 | 0 | 0 |

The symbols are the same as for the transmitted data except that the pad-idle symbol is not sent by the modem to the testing system 10. Instead, an indication called bad-signal is sent when the modem detects an error in a received message frame.

The modem 12 provides a transmit clock signal, TXCLK, to the testing system 10. This signal synchronizes the transmission of data to the modem. The modem also provides a receive clock signal, RXCLK, to the testing system which signal corresponds to the rate of the received data.

By forcing the TXSYM3 line low, the remaining three Tx Data lines can be used to send station management commands to configure the modem 12. Similarly when the RXSYM3 line is low, the remaining three Rx Data lines carry management data from the modem to the testing system as per the 802.4G standard.

Test Set Circuit

Figure 3:
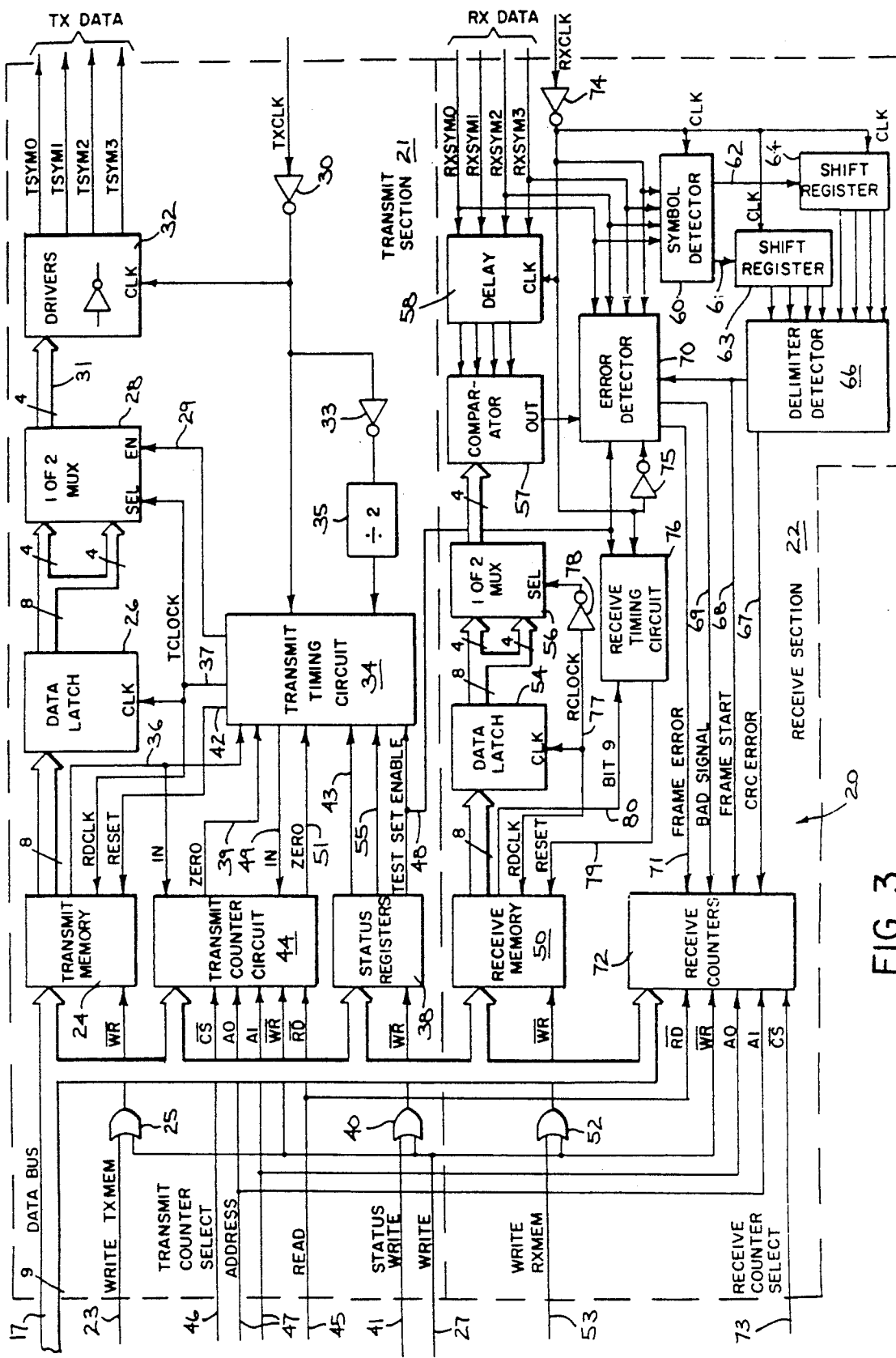
FIG. 3 is a detailed schematic diagram of the interface test set of the present testing system.

As shown is FIG. 3, the interface test set 20 has a transmit section 21 and a receive section 22. With respect to the transmit section 21, the nine bit wide data bus 17 from the personal computer 18 is coupled to the data input of a transmit memory 24. The transmit memory is preferably a first-in first-out (FIFO) device having 1024 storage locations each of which is nine bits wide. This enables two four bit nibbles to be stored at each storage location with each nibble containing the four Tx Data bits representing one symbol of the message frame. The ninth bit is used to indicate the end of the message frame.

An input of the transmit memory 24, which controls the writing of data into the memory from the data bus 17, is connected to the output of a first OR gate 25. One input of the first OR gate is connected to line 23, designated WRITE TXMEN, of the control bus 19 from the personal computer 18. The potential applied to line 23 goes to a low logic level when data is to be written into the transmit memory 24. The other input to the first OR gate 25 is connected to the WRITE control line 27 from the personal computer 18 which goes to a low logic level whenever data on the control bus 17 is to be written into any of components of the interface test set 20.

The eight least significant bits of the output from the transmit memory 24 are coupled to a first eight-bit wide data latch 26. The ninth output bit from the transmit memory 24 is applied to line 36. The four least significant bits of the output from the data latch 26 are connected to one input of a first 1 of 2 multiplexer 28 and the four most significant bits are connected to the other input of the first multiplexer 28. When the first multiplexer 28 is enabled, the level of the signal applied to its selector input via line 37 determines which one of the sets of four input bits is coupled to its four output lines 31. The four output lines 31 from the first multiplexer 28 are connected to a set of four line drivers 32, the outputs of which are coupled via the Tx Data lines to the modem 12.

The system data bus 17 also is connected to the inputs of a set of status registers 38 which store bits indicating different modes of test set operation, as will be described. The status registers 38 comprise a set of D-type flip-flops, each having their D input connected to one of the data bus lines and their clock inputs connected in common to a write terminal (WR). The write terminal is connected to the output of a second OR gate 40 with one input terminal connected to the WRITE control line 27 and the other input coupled to a STATUS WRITE control line 41 from the personal computer 18.

The transmit section 21 further includes a programmable transmit counter circuit 44, such as a 8254 type device manufactured by Intel Corporation. The transmit counter circuit 44 has a pair of sixteen bit counters, each of which can be preloaded with a number and then decremented by a input signal pulse. When each counter reaches zero, an output pulse is generated on a separate output line 39 or 51 and the counter is reinitialized with the original preloaded number. The transmit counter circuit 44 is connected to the data bus 17 so that each counter can be read or preloaded by the personal computer 18. To accomplish the reading, the read control terminal (RD) is coupled to a control line 45 from the personal computer 18 which receives a low level READ signal whenever data is to be read from the interface test set 20. A chip select input (CS) of the transmit counter circuit 44 is coupled to another control line 46 from the personal computer 18 which receives an active on low level signal whenever the contents of a counter is to be read out or written into by the personal computer A write input control terminal (WR) of the transmit counter circuit 44 is coupled directly to the WRITE control line 27 from the personal computer. A pair of counter ADDRESS lines 47 from the personal computer are coupled to address inputs of the transmit counter circuit 44 to access each counter individually.

A first counter of circuit 44 functions as a frame counter and is preloaded with the number of times that the test frame is to be transmitted. The first counter is decremented by the ninth output bit on line 36 from the transmit memory 24. The zero indication output from the first counter is coupled via line 39 to a transmit timing circuit 34. The second counter of circuit 44 is preloaded with the number of silence symbols to be transmitted between test message frames The decrementation input of the second counter receives a pulse on line 49 from the transmit timing circuit 34 whenever a silence symbol is sent between test message frames. The zero indication output of the second counter is fed back to the transmit timing circuit 34 over line 51.

The TXCLK signal from the modem 12 is received at the input of a first inverter 30, the output of which is coupled to the transmit timing circuit 34 both directly and via a second inverter 33 and a divide by two circuit 35. The transmit timing circuit 34 also receives the ninth output bit from the transmit memory 24 via line 36 and control bits stored in the status registers 38 via lines 43, 48 and 55. In response to the various input signals, the transmit timing circuit 34, as will be discussed in detail hereinafter, generates an enable signal for the first multiplexer 28 on line 29. The transmit timing circuit 34 also provides a clocking signal, TCLOCK, on line 37 that is connected to the selection input 30 of the first multiplexer 28, the clock input of the first data latch 26 and the read clock (RDCLK) terminal of the transmit memory 28. In response to a high logic level ninth output bit from the transmit memory, the transmit timing circuit also generates a reset signal on line 42 for the transmit memory 24. The timing circuit 34 comprises a programmable logic array formed using conventional techniques.

Referring still to FIG. 3, the receive section 22 of the interface test set 20 has its own memory 50 which is similar to the transmit section memory 24. Specifically, the receive memory 50 is a nine bit wide first-in first-out device with its data input terminals connected to the data bus 17. The write control input of the receive memory 50 is coupled to the output of a third OR gate 52. One input of the third OR gate 52 is connected to the WRITE control line 27 and the other input is connected to a control line 53 which is at a low level designated WRITE RXMEN whenever the personal computer 18 writes data into the receive memory 50. The eight most significant bits in the output from the receive memory 50 are coupled to the input of a second eight bit data latch 54. The ninth output bit from the receiver memory 50 is coupled to line 80.

The four most significant output bits from the second data latch 54 are connected to one input of a second multiplexer 56 and the four least significant bits from the data latch 54 are connected to the other input of the second multiplexer. The four output lines of the second multiplexer 56 are connected to one input of a four bit comparator 57. The four Rx Data lines from the modem 12 are coupled by a delay circuit 58 to the other input of the four bit comparator 57. The comparator 57 compares the corresponding bits of its two inputs and produces a signal at its output, the level of which represents the result of the comparison. The output of the comparator 57 is coupled to an error detector circuit 70.

The four Rx Data lines are also connected to a symbol detector 60 which contains logic circuitry that recognizes the bit patterns on the four Rx Data lines which correspond to the non-data and zero symbols whenever a non-data symbol is detected in the Rx Data output from the modem 12, the symbol detector 60 produces a high logic level on a first output line 61 which is connected to the input of a first serial-in parallel-out four-bit shift register 63. In addition, the symbol detector 60 produces a high logic level on a second output line 62 whenever a zero symbol is detected This second output line 62 is connected to the input of a second serial-in parallel-out four-bit shift register 64. The four parallel output lines from each of the first and second shift registers 63 and 64 are connected to a frame delimiter detector 66.

The frame delimiter detector 66 consists of a logic circuit which detects the start delimiter at the beginning of each of the message frames As shown in FIG. 2, this delimiter is a set of eight consecutive symbols, four of which are non-data symbols and the remaining four are zero symbols. Whenever this pattern is detected, the delimiter detector circuit 66 produces a high level signal on an output line 68. If eight consecutive symbols are found with four non-data symbols and three zero symbols, or four zero symbols and three non-data symbols, a high level output is also produced on line 68 indicating a valid start delimiter was received. In this latter case, it is assumed that only a start delimiter could contain either of these combinations of symbols. Output line 68 from the delimiter detector is connected to the error detector circuit 70. The delimiter detector 66 also senses the reception of an end delimiter. When an end delimiter is sensed, a high level pulse is sent on line 67 if the E-Bit of the delimiter is set indicating a CRC error was detected by the head end 16.

The error detector circuit 70 also is coupled to the four Rx Data lines and the output of the four bit comparator 57. The error detector circuit 70 senses a bad-signal symbol from the modem 12 via the Rx Data lines indicating that the modem has detected an error in the received data. In response to the detection of a bad-signal symbol, a pulse is sent on line 69 by the error detector 70. A similar pulse is applied to line 71 whenever the error detector receives a signal from the comparator 57 indicating that the transmitted and received symbols are not identical. The pulse on line 71 identifies the occurrence of errors that were not detected by the modem. The operation of the error detector 70 will be described in further detail hereinafter.

The output lines 67 and 68 from the delimiter detector 66 and output lines 69 and 71 from the error detector circuit 70 are coupled to the inputs of four separate receive counters 72. Each counter tabulates the number of high level pulses received on its respective input line to produce counts of the number of message frames received, CRC errors, and errors detected and not detected by the modem 12. The receive counters 72 can comprise a pair of 8254 programmable counter integrated circuits manufactured by Intel Corporation.

The data bus terminals of the receive counters 72 are coupled to the system data bus 17. The read and write control inputs of the receive counters 72 are coupled to the READ control line 45 and the WRITE control line 27 respectively from the personal computer 18. The chip select input (CS) of the receive counters is connected to a RECEIVE COUNTER SELECT control line 73 from the personal computer. If a pair of 8254 programmable counter circuits are used, separate select control lines from the personal computer must be provided for each device. The address control lines 47 from the personal computer are connected to the address inputs of the receive counters 72 in order to address a specific one of the counters therein.

The receive clock signal line, RXCLK, from the modem 12 is connected via a third inverter 74 to the clock inputs of the delay circuit 58, the symbol detector 60, the first and second shift registers 63 and 64, and a receive timing circuit 76. The output of the inverter 74 is inverted by a fourth inverter 75 having an output connected to the error detection circuit 70.

In response to the RXCLK signal, the receive timing circuit 76 provides a clock signal RCLOCK on line 77 which is coupled to the second data latch 54 and to the read clock input of the receive memory 50. The RCLOCK signal is inverted by a fifth inverter 78, the output of which is coupled to the select input terminal of the second multiplexer 56. The RCLOCK signal has a frequency which is one-half that of the RXCLK signal from the modem 12. The receive timing circuit 76 also receives the ninth output data bit from the receive memory 50 on line 80. In response to that ninth bit being set, the receive timing circuit 76 generates a reset signal on line 79 that is applied to the reset terminal of the receive memory 50. The test set enable signal on line 48 from the status registers 38 is applied to an enable input terminals of the receive timing circuit 76 and the error detector 70. The receive timing circuit 76, as well as the symbol, delimiter, and error detectors 60, 66, and 70, are formed on programmable logic arrays using conventional techniques.

System Operation

The present network interface testing system 10 has two basic modes of testing. In the first test mode, the entire test message frame is repeatedly transmitted to the modem 12. The operator is afforded the opportunity to specify the number of times that the test message frame is to be repeated and the amount of silence in between each message frame transmission. Alternatively, the first test mode can be set to continually send the message frame on the network until manually stopped. In the second test mode, the header of the test message frame is transmitted once and the data field is repeatedly transmitted to provide a continuous stream of data on the network This second test mode is particularly useful in aligning the circuits in the network head end 16.

A test is initiated by the operator writing the test message frame in the personal computer 18 where it is stored in the computer's memory. At the same time, the operator designates the number of repetitions for the message frame and the time period between frame transmissions The test message frame is then loaded into the interface test set 20 along with configuration data designating the mode of operation. The test set 20 then commences transmission of the message frame to the modem 12. Soon thereafter, the modem demodulates the echoed transmission from the network and sends the received symbols to of the interface test set 20. The receive section 22 of the interface test set 20 compares the transmitted and received symbols to provide a count of the number of message frame errors. This information is then made available to the personal computer 18 for further analysis The system operation will be described with reference to the flow chart, depicted in FIG. 4, of the testing program for the personal computer 18 and to the test set circuit shown in FIG. 3. At the beginning of the execution of the testing program, the variables and counters used by the program are initialized at step 100. At the same time, control signals are sent to the interface test set 20 to reset its components. Then at step 102 the operator selects the mode of operation between interface test and station management routines When the interface is to be tested, the program advances from step 102 to step 108 where the operator creates a string of control characters representing the message frame for the test. This may be accomplished by the operator selecting the standard protocol header and end delimiter symbol sequences or specifying each symbol of these sequences. Each of the standard symbol sequences is selected by entering a single control code character into the computer instead of entering control characters for each symbol of the sequence. The operator can either specify a control character for each symbol of the data field or instruct the personal computer 18 to generate a specified number of one and zero symbols in a random pattern selected by the computer. By enabling the operator to specify each symbol of the message frame, invalid header, start delimiter and end delimiter symbol, sequences can be specified. This latter technique enables the reaction of the modem 12 and head end 16 to invalid symbol sequences to be examined. For example, one of the eight symbols used in the standard protocol start delimiter may be changed to test the error recovery capabilities of the network equipment. In addition, the operator can designate pad-idle or silence symbols in the data field where such symbols are not normally found. The message frame sequence defined by the operator is then stored within the memory of the personal computer 18.

Once the test message frame has been defined, the control characters in the defined string are interpreted to generate the actual symbols for the message frame at step 110. For example, the control character code that represents the conventional frame header is interpreted by the control program to generate the proper sequence of pad-idle and start delimiter symbols for the header. Each symbol is represented by the four bit Tx Data pattern for the modem 12. The assembled message frame is then stored in another portion of the personal computer memory.

The operator then chooses between the repetitive and continuous test modes at step 112. If the repetitive test mode is selected, the program advances to step 114 where the operator is asked to enter the number of times that the test message frame is to be repeated. As this point, the operator can specify that the test message frame is to be continually repeated until stopped manually. Then, the control program within the personal computer 18 queries the operator to enter the number of silence symbols to be transmitted between each repetition of the test message frame at step 116. The number of silence symbols determines the amount of time between the repetition of the frame transmission.

The test message frame symbols are loaded into the transmit memory 24 at step 117. In loading the test message frame into the transmit memory 24, personal computer 18 simultaneously forces the WRITE TXMEM control line 23 and the interface test set WRITE line 27 low. These two low signals generate a low level write enable signal from the first OR gate 25 which is applied to the write control terminal (WR) of the transmit memory 24. The personal computer 18 generates the four bits for each symbol and then combines the sets of four bits for two symbols of the message frame into a single nine bit data word. The ninth bit of the data word is zero. This word is sent in parallel over the data bus 17 into the transmit memory 24. The WRITE TXMEM control line 23 is then strobed to step the transmit memory 24 to the next storage location and the next pair of message frame symbols is stored in that location This process is repeated for each pair of symbols in the test message frame. If there are an odd number of symbols, four bits of dummy data are combined with the last message frame symbol to form eight bits of data for storage in the transmit memory 24. Although the network protocol may require that the message frame has a whole number of symbol octets, this restriction is not placed on the test message frame Following the storage of the last message frame symbol in the transmit memory 24, the personal computer 18 stores a nine bit word consisting of all ones into the transmit memory 24. The setting of the ninth bit of a data word stored within the transmit location indicates the end of the test message frame As the data field and end delimiter are being stored in the transmit memory 24, the symbols for these fields of the test message frame are also stored in the receive memory 50. When the first pair of symbols of the data field are sent from the personal computer 18 over the data bus 17, the personal computer applies a low logic level to the WRITE RXMEM control line 53. As the WRITE control line 27 is already low, both inputs to the third OR gate 52 will be low at this time producing a low level at the write enable terminal (WR) of the receive memory 50. As a result, the remainder of the test message frame including the final word of all one bits will be stored in the receive memory 50. The receive section 22 includes hardwared logic to detect a valid start delimiter so that this sequence of symbols does not have to be stored in the receive memory. A detailed explanation of the receive section operation follows the description of the transmit section operation.

Then, at step 118, the number of message frame repetitions is sent from the personal computer 18 to the interface test set 20. The repetition number is stored in the frame counter of the transmit counter circuit 44 by holding the WRITE control line 27 and the TRANSMIT COUNTER SELECT line 46 low simultaneously while applying the proper counter address bits to lines 47. If continual repetition of the message frame was selected, the loading of the frame counter at step 118 can be bypassed. Following the loading of the first counter of circuit 44, the number of interframe silence symbols is loaded into another counter in the transmit counter circuit at step 119.

Next, at step 120, a data byte containing the status control bits is stored by the personal computer 18 in the test set status registers 38. The status control bits configure the mode of the test set operation to the one previously selected by the operator. Specifically, one control bit indicates the continuous or repetitive modes, another bit indicates continual repetition or a limited number of repetitions. An additional status bit enables and disables the test set 20. The loading of the status registers is accomplished by forcing the STATUS WRITE control line 41 and the test set WRITE line 27 low. This produces a low logic level output from the second OR gate 40 placing the status registers 38 in the write mode. The status register data bits are then sent in parallel over the data bus 17 and are stored in corresponding locations in the status registers 38.

Once the status registers 38 have been loaded, their contents are sent over lines 43, 48 and 55 to configure the transmit timing circuit 34 shown in FIG. 3. The repetitive mode is indicated by the logic level on line 43 and whether a limited number of transmission repetitions is to occur is indicated by the logic level on line 55. In the repetitive mode, the transmit timing circuit 34 is configured to send silence symbols between each transmission of the test message frame.

The output from the status registers on line 48 enables the transmit timing circuit 34 to commence transmission of the test message frame. Specifically, the transmit timing circuit 34 applies the output of the divide-by-two circuit 35 to line 37 as the TCLOCK signal. This application provides a synchronous clocking signal at one-half the rate of the transmit clock signal, TXCLK, received from the modem 12. In addition, the first multiplexer 28 is enabled by a signal on line 29 from the timing circuit 34. In response to each cycle of the TCLOCK signal, eight bits of data representing two symbols of the message frame are read from the transmit memory 24 and stored in the data latch 26. On each half-cycle of the TCLOCK signal, one of the two four bit nibbles stored in the data latch 26 is coupled via the first multiplexer 28 to the inputs of the drivers 32 where they are transmitted to the modem 12 via the Tx Data lines. The timing circuit 34 continues to clock data from the memory onto the Tx Data lines until the last symbol of the test message frame is transmitted.

Since the test message frame by definition does not necessarily conform to the network protocol, the end of the frame cannot be determined from a fixed symbol pattern. Instead, the end of the test message frame is detected by the transmit timing circuit 34 sensing the ninth bit of data stored at each location of the transmit memory 24. As the contents of each location is read out of the transmit memory, the ninth output bit is sent via line 36 to the frame counter 44 and the transmit timing circuit 34. As noted previously, the word stored in the memory 24 immediately after the message frame has this ninth bit set, while all words containing message symbols have the ninth bit cleared. In response to the ninth bit being set, the transmit timing circuit 34 sends a memory reset signal via line 42 to the transmit memory 24. The transmit FIFO memory 24 responds to this signal by resetting its internal address pointer to the first storage location of the memory The transmit timing circuit 34 also ceases producing the TCLOCK signal.

The ninth output bit from the transmit memory 24 is also coupled by line 36 to the frame counter in the transmit counter circuit 44. In response to receiving a set ninth bit from the transmit memory, the frame counter decrements the preloaded count of the number of message frames to transmit If the frame counter 44 is now zero, a pulse is sent over line 39 to the timing circuit 34 which in response stops all operation of the transmit section 21. However, if the contents of the frame counter 44 is a nonzero value or if continual repetitions are to be sent, the transmit timing circuit 34 begins transmitting silence symbols.

With reference to Table 1, the silence symbol is represented by high logic levels applied to each of the four Tx Data lines. To generate the silence symbol, the transmit timing circuit 34 disables the first multiplexer 28 which in response produces low logic levels on each of its four output lines 31. These low logic levels are inverted by the driver circuit 32 to produce the four high levels on the Tx Data lines. The transmit timing circuit 34 then couples the TXCLK signal to line 49 to decrement the count of silence symbols in the transmit counter circuit 44 each time one of these symbols is transmitted. When the appropriate number of silence symbols has been sent, the counter reaches zero, which is indicated by a signal on line 51. This counter is then reinitialized to the number of silence symbols selected by the operator. In response to the zero count indication signal on line 51, the transmit timing circuit 34 once again enables the first multiplexer 28 and begins applying the TCLOCK signal to line 37 to send another test message frame over the network. This sequence is repeated until the specified number of message frames has been transmitted as indicated by a zero count pulse on line 39 from the frame counter in the transmit counter circuit 44.

As each message frame is being transmitted, the modem 12 is receiving an echo of that frame over the network medium 14 and demodulating it to produce signals on the four Rx Data lines representing each received data symbol. As each received symbol is sent to the test set 20 by the modem 12, the modem sends a pulse on the receive clock line RXCLK which is used to clock the symbol bits through the receive section 22. These data symbols are processed by the receive section 22 of the interface test set 20 and compared with the symbols that were previously transmitted to detect transmission errors.

Typically, the first sequence of symbols in each received message frame are pad-idle symbols which are used by the demodulator in the modem 12 to synchronize its operation to the data rate of the received message frame. As shown in Table 2 above, the pad-idle symbols are not sent by the modem on the Rx Data lines. As a result, the Rx Data and RXCLK lines are inactive during the modem's receipt of the pad-idle symbols from the network medium 14. The inactivity of these lines provides an indication that another message frame is starting to be received.

Therefore, the first symbol sent to the test set 20 by the modem 12 will be the symbol at the beginning of the start delimiter. As the eight symbols of the start delimiter are sent to the test circuit, they are clocked by the inverted RXCLK signal into the symbol detector 60 shown in FIG. 3. The symbol detector 60 senses the four Rx Data lines to detect whether a non-data symbol or a zero symbol is present. If a non-data symbol is detected, a high logic level is sent via line 61 to the first shift register 63. Similarly, if a zero symbol is detected, a high logic level is sent via line 62 to the input of the second shift register 64. The inverted receive clock signal RXCLK is used to synchronize the symbol detector 60 and clock the data through the two shift registers 63 and 64.

The delimiter detector 66 continuously monitors the four output bits from each of the shift registers 63 and 64 to sense a start delimiter from the modem. A valid start delimiter will be detected when the eight outputs from these shift registers 63 and 64 are all high logic levels. If one of the eight bits from the shift registers 63 and 64 is a low level, the frame start delimiter detector 66 will also interpret this pattern as a valid start delimiter. When a valid start delimiter is found, the delimiter detector 66 transmits a high logic level start of frame pulse on line 68 to the frame counter in the receive counter circuit 72. This high logic level causes an incrementation of the count of the number of frames that have been received.

The start of frame pulse from the delimiter detector 66 is also applied to the receive timing circuit 76 and the error detector 70 as a signal to commence operation. Thereafter, the receive timing circuit 76 generates a clock signal RCLOCK on line 77 which has one-half the frequency of the receive clock signal. Each pulse of the RCLOCK signal sequentially clocks eight bits of data, two data symbols, from the receive memory 50 and stores them in the second data latch 54. As described above, the data field and end delimiter of the test message frame were previously stored in the receive memory 50. The RCLOCK signal is also applied to the select input of the second multiplexer 56 to switch its output between the two inputs that contain the bit patterns representing each of the two data symbols read from the receive memory 50. The four bits corresponding to the selected symbol are fed from the multiplexer 56 to one input of the four bit comparator 57.

The inverted receive clock signal RXCLK also is used to clock the bits on the Rx Data lines, which represent the received data symbol, through a two clock cycle delay circuit 58. The two clock cycle delay is necessary to compensate for the propagation delays in the data latch 54 and multiplexer 56 so that the data symbol read from the memory 50 will be applied to the comparator 57 in time coincidence with the identical symbol received from the modem 12. The result of the comparison of the transmitted and the received data symbols is sent from the comparator 57 to the error detection circuit 70.

The error detection circuit 70 senses several types of errors and sends an indication of these errors to the receive counters 72. If the modem 12 detects an error in the signal received from the network medium 14, it will send a bad-signal symbol on the Rx Data lines to the test set 20. The error detector 70 senses the bit pattern on the Rx Data lines which represents the bad-signal symbol. In response to finding this error symbol, a pulse is sent on line 69 to a second one of the receive counters 72, which tabulates the modem detected errors. In addition, the error detector 70 uses the RXCLK signal from inverter 75 to synchronously sense when the comparator 57 has found non-identical transmitted and received symbols. When the first set of non-identical symbols is found in a frame, the error detector sends a pulse on line 71 to a third one of the receive counters 72. This third counter tabulates frame errors which were undetected by the modem 12. If the delimiter detector 66 senses a CRC error indication in the E-Bit of the end delimiter, a counting pulse is sent on line 68 to a fourth one of the receive counters 72.

Figure 4:
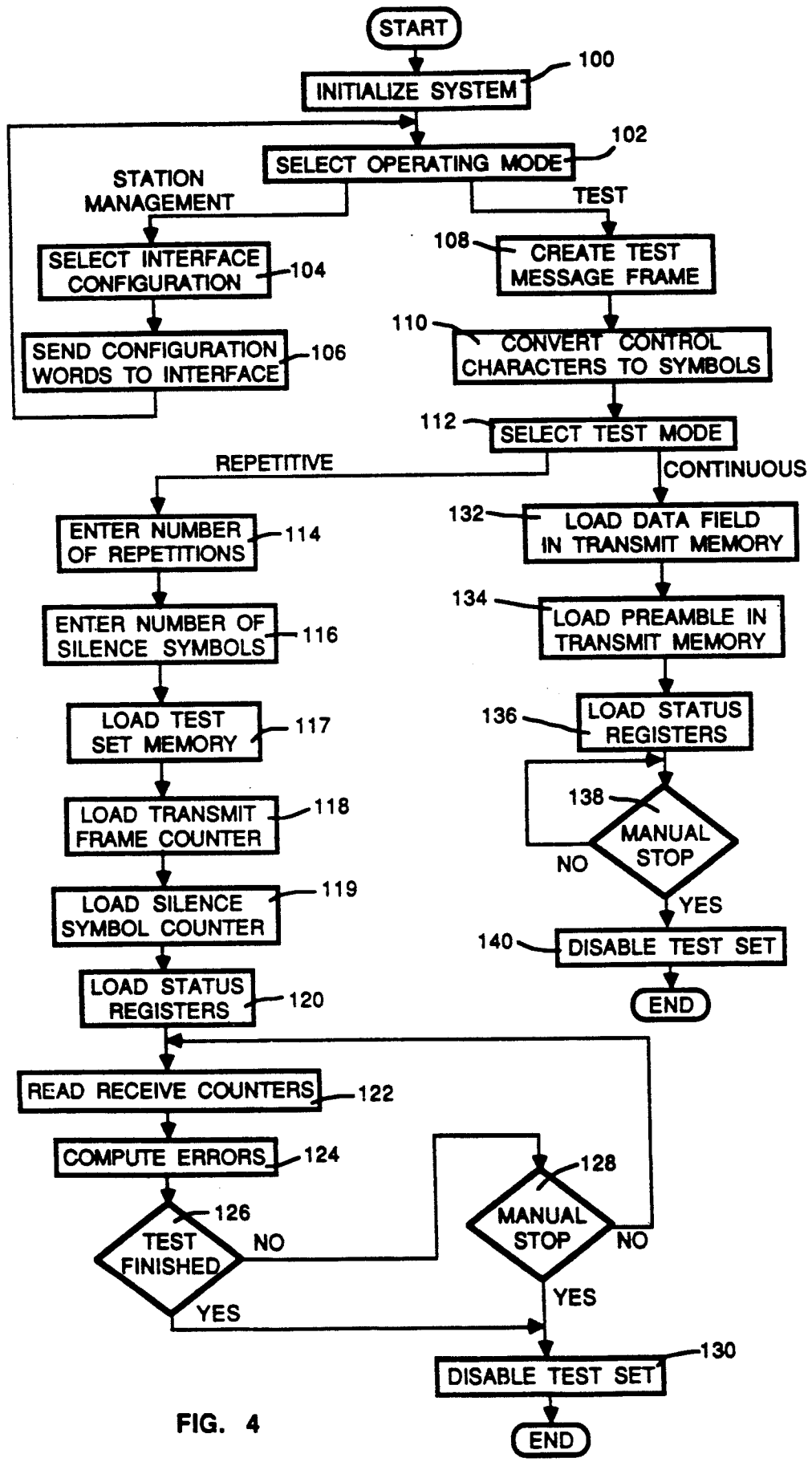
FIG. 4 is a flow chart of the software for the current testing system.

With additional reference once again to the flow chart of FIG. 4, as the data is being received by the test set 20, the personal computer 18 is continuously reading the contents of the four receive counters 72 at step 122. This reading is accomplished by the personal computer applying low logic levels to the test set READ control line 45 and the RECEIVE COUNTER SELECT line 73. The personal computer also sequentially applies the proper counter address bits to the test set ADDRESS lines 47 to select each of the four receive counters 72. In response to the proper addressing, the contents of the counter are read out over the data bus 17. The personal computer 18 then uses the counter data to compute the bit error rate at step 124. The bit error rate is the number of frame errors divided by the product of the number of frames received times the number of bits per frame. The number of start delimiter errors is also computed by subtracting the number of received message frames from the number that were transmitted. The computed bit error rate and start delimiter errors along with the contents of the counters in the interface test set 20 are displayed to the operator on the CRT screen of the personal computer 18.

Then, at step 126, the personal computer 18 determines whether or not the test is completed by comparing the current number of message frames received to the number of received frames previously read out of the interface test set 20 to determine whether message frames are still being received. If the test is not finished, the program advances to step 128 where an examination is made to determine whether the operator has indicated a manual termination of the test via the keyboard of the personal computer 18. If the operator is not manually indicating a termination, the program execution returns to step 122 where the receive counters 72 in the test set 20 are again read. If either a determination is made at step 126 that the test has finished or a manual stop occurs at step 128, the test set 20 is disabled at step 130 by the personal computer 18 storing the appropriate control bits in status registers 38. This status change removes the test set enable signal from line 48. In response thereto, the transmit and receive timing circuits 34 and 76 cease sending clock pulses to the various test set components. Once the test set 20 has been disabled, the repetitive test routine ends.

As noted previously, the operator may select a test mode at step 112 in which the header of the test message frame is transmitted a single time with the data field being continuously transmitted without interframe silence symbols This test mode is particularly useful for aligning the network head end 16 as data is being continuously carried over the network medium 14. When the operator selects the continuous test mode, the program advances to step 132. At this point, the data field alone is loaded into the transmit memory 24 by the personal computer 18. Following the data field, a word consisting of all one bits is stored in the next location of the transmit memory 24. Next, at step 134, the personal computer 18 loads the message frame header into the next highest set of storage locations in the transmit memory 24. Following the loading of the header, the personal computer stores another word in the transmit memory 24 that consists of all one bits.

At step 136, the personal computer then loads the status registers 38 of the interface test set 20 with the proper set of control bits to designate the continuous test mode and enable its operation. In response to the loading of the status registers, the transmit timing circuit 34 begins applying the TCLOCK signal to the read clock input RDCLK of the transmit memory 24 so that the memory steps through its storage locations containing the data field cf the message frame. However, at this time the timing circuit 34 does not apply an enable signal over line 29 to the first multiplexer 28. Therefore, although data is being read out of the transmit memory 24, it is not being fed through the first multiplexer 28 to the drivers 32 and to the modem 12. Therefore, the data field at this time is not being transmitted over the network.

When, at the end of the data field, the first word containing all one bits is read out of the transmit memory 24, the high level ninth output bit is received by the transmit timing circuit 34 over line 36. In response to a high level on line 36, the transmit timing circuit enables the first multiplexer 28 and applies the TCLOCK signal to the components of the transmit section 21. The transmit timing circuit 34 does not issue a reset signal to the transmit memory 24 upon this occurrence of a high level on line 36. Therefore, the next word read from the transmit memory 24 will contain the first two symbols of the message frame header which are sequentially fed by the first multiplexer 28 to the drivers 32 and ultimately to the modem 12. In this manner, the first symbols sent over the network in the continuous test mode are those of the header for the message frame. At the end of the header, another word consisting of all one bits is read from the transmit memory 24. This produces a high level on the ninth output bit line 36 which now causes the transmit timing circuit 34 to issue a reset signal on line 42 to the transmit memory 24. As this memory is a first-in first-out memory, the high level on line 36 resets the internal address pointer to the first storage location which contains the first pair of symbols of the data field.

The operation of the transmit section 21 continues to sequentially transmit the symbols of the message frame to the modem 12. When the end of the data field is encountered, the subsequent data word stored in the transmit memory 24 will contain all one bits. When the high logic level ninth output bit is applied from the transmit memory 24 to the transmit timing circuit 34 via line 36, the transmit timing circuit will once again reset the transmit memory 24 by a pulse on line 42. This resetting will initialize the internal address pointer of the transmit memory 24 to its first storage location so that the data field is immediately read out and transmitted again to the modem 12. No silence symbols are sent in this test mode.

This continuous transmission of the data field occurs until the operator manually terminates it at step 138 by the appropriate entry into the keyboard of the personal computer 18. When this entry occurs signaling the termination of the continuous test mode, the test set 20 is disabled at step 140 by the personal computer 18 storing a control byte in status registers 38 which resets the test set enable signal on line 48. Once the test set has been disabled, the continuous test mode ends.

As an alternative to conducting a test of the network interface, the modem 12 can be configured by selecting the station management routine at step 102. If this routine is selected, the program execution advances to step 104 where the operator defines the various configuration variables from a menu presented on the personal computer 18. Once all of the configuration variables have been selected, the appropriate corresponding control words are transmitted to the modem at step 106 to configure it as specified by the operator. The program execution then returns to step 102 where the operator is requested again to select the mode of operation.

What is claimed is:

1. A system for testing components of a communication network over which messages are sent in frames, each frame having a header including a first predefined sequence of data symbols, a data field including a definable sequence of data symbols, and an end delimiter having a second predefined sequence of data symbols, said system comprising:

means for the user to designate the data symbols in a series of data symbols which series does not necessarily contain the predefined sequences of symbols for the header and end delimiter;

a transmit section including a first memory means for storing the series of data symbols, and a means for transmitting the symbols stored in the first memory means to an interface device of the network; and a receive section including means for receiving a sequence of data symbols from the interface device, a second memory means for storing at least a portion of the series of data symbols, means for comparing a plurality of data symbols in the sequence of data symbols with the data symbols stored in the second memory means, means responsive t the means for comparing for indicating errors in the received sequence of data symbols, and means for counting indicated errors; and wherein each of the first and second memory means includes:

(a) a first-in first-out memory having a plurality of storage locations each of which for storing a byte of data;

(b) a multiplexer having a pair of four bit wide inputs and a four bit wide output; and (c) means for coupling one group of four bits of each byte of data read from said memory to one input of said multiplexer and for coupling another group of four bits of each byte of data read from said memory to the other input of said multiplexer.

2. The system as in claim 1 wherein said receive section further includes a circuit for detecting the first predefined sequence of data symbols in the received sequence of data symbols and in response thereto enabling the read out of data symbols from said second memory means.

3. The system as recited in claim 1 wherein the transmit section further includes a control circuit for repeatedly transmitting the series of data symbols stored in the first memory means to the interface device, and means for defining the amount of time between each repetition of the sending of the series of data symbols.

4. The system as recited in claim 3 wherein the means for defining the amount of time includes means for transmitting a given number of silence symbols to the interface device.

5. The system as recited in claim 3 wherein the control circuit includes means for limiting the number of times that the series of data symbols is repeatedly transmitted to a predefined number.

6. The system as recited in claim 1 wherein the receive section further includes means for detecting the first predefined sequence of data symbols in the received sequence of data symbols.

7. The system as recited in claim 6 wherein the receive section further includes means for detecting the second predefined sequence of data symbols in the received sequence of data symbols.

8. The system as recited in claim 7 wherein the means for indicating errors is also responsive to the two means for detecting the predefined sequences whereby an error is indicated if either one of the predefined sequences is not detected.

* * * * *